United States Patent [19]
Favini

[11] 3,859,628
[45] Jan. 7, 1975

[54] ELECTRIC ALARM DEVICE FOR INDICATING THE VARIATION OF A PHYSICAL QUANTITY IN A VEHICLE TIRE

[75] Inventor: Fiorenzo Favini, Milan, Italy
[73] Assignee: Industrie Pirelli S.p.A., Milan, Italy
[22] Filed: June 11, 1973
[21] Appl. No.: 368,998

[30] Foreign Application Priority Data
June 16, 1972 Italy.................................. 25764/72

[52] U.S. Cl................................ 340/58, 200/61.22
[51] Int. Cl............................................ B60c 23/02
[58] Field of Search.......... 340/58, 52 R; 200/61.08, 200/61.22, 61.25

[56] References Cited
UNITED STATES PATENTS
3,602,884  8/1971  Brumbelow........................... 340/58
3,760,351  9/1973  Thomas................................ 340/58

Primary Examiner—Alvin H. Waring
Attorney, Agent, or Firm—Clelle W. Upchurch

[57] ABSTRACT

An apparatus is provided for monitoring a physical quantity in a pneumatic tire and for detecting variation in the physical quantity outside a preset limit which combines a battery having two electrodes and an electrolyte in a sealed outer casing, a detector means for detecting variation outside the preset acceptable limit and a means coupled to the detector means for opening the sealed casing when the variation is detected to thereby permit contact between the electrolyte and the electrodes to generate an output voltage and actuate an alarm.

7 Claims, 4 Drawing Figures

ELECTRIC ALARM DEVICE FOR INDICATING THE VARIATION OF A PHYSICAL QUANTITY IN A VEHICLE TIRE

BACKGROUND OF THE INVENTION

1. Field of the Invention

The present invention concerns an electric alarm device for indicating the variation of a physical quantity, beyond preestablished limits, and it relates in particular to a device which can provide a continuous check without any possibility of faults due to a complete or partial failure in the power supply.

2. Description of the Prior Art

Several alarm devices are already known, as for instance those used for remote control surveillance of rooms in public buildings, or for the immediate indication of irregularities, for example of pressure and temperature, in the various processing steps of a production cycle, or for measuring and indicating variations of physical quantities in machines or parts of machines in rotation. These devices can be supplied with power by connecting them with the electric mains, or by means of batteries or accumulators.

The connection between the alarm device and the mains can be carried out directly or, more commonly, by means of transformers, in order to utilize components having low voltage requirements so as to reduce the dimensions and the space of the circuits. This type of supply affords on one hand the advantage of ensuring a constant voltage for long-time periods, but has, on the other hand, the disadvantage of failing to operate, due to a power failure in the mains, just at the time the device should work, to indicate, for instance, the excessive rise of temperature in an oven.

The battery-type supply offers the advantage of being independent of power failures or other faults in the mains; however, it has the drawback of having a limited life and of supplying an output voltage which decreases with time, so that a relay cannot be energized or a transistor cannot be converted from an OFF to an ON state, with a consequent insufficient degree of reliability of the electric circuit of the alarm device.

The accumulator-type supply offers the advantage that recharging operations can be carried out regularly in time, re-establishing in this way the correct output voltage rate. However, in this case also there is the possibility that, between one inspection of the accumulator and the next, a drop of voltage may occur so as to prevent during that time the operation of the alarm system to indicate an irregularity of the quantity under control. It has been proposed to eliminate these disadvantages by using a combination of a mains supply and an accumulator supply, the first being used for the normal operation of the device, and the second for supplying the latter when a long-term fault occurs in the mans. Moreover, in this case, during the normal operation period, the accumulators are constantly maintained under charge through the mains voltage, therefore preventing the voltage output potential of the accumulators from decreasing below a critical value necessary to operate the alarm system.

This latter type of supply, owing to the number of devices used, takes up a considerable amount of space and is relatively expensive, as it is necessary to provide, besides the battery cells and the connection with the mains, a recharge circuit and an element, sensitive to the drop in voltage, which switches the supply terminals of the alarm device from the mains to the accumulator. It can be understood that a supply of this type is suitable for alarm devices which can be connected to the mains and do not involve space problems, with the exclusion, therefore, of devices situated in positions to which access is difficult or positioned in places which do not provide or cannot have a mains supply, as for instance in the case of a circuit for checking the physical quantities of a rotating wheel, which is mounted on the wheel itself, as in a motor vehicle. It is moreover known that both batteries and accumulators are subjected, in the course of time, to a wear of their electrodes due to the action of the electrolyte or of the chemical substance in which they are immersed; unfortunately, this drawback still occurs in all of those supply systems which employ batteries and accumulators.

SUMMARY OF THE INVENTION

The present invention aims at providing an electrical alarm device having a reliable power supply, in order to eliminate the above mentioned disadvantages.

Accordingly, the object of the present invention is to provide an electric alarm device for indicating the variation of a physical quantity, which comprises first means sensitive to the value of the physical quantity, and is characterized by second means able to generate an electric voltage, the parts of the second means, in the condition corresponding to values of the physical quantity comprises within pre-established limits, being separated and electrically inoperative, and, in the condition corresponding to values of the physical quantity below the pre-established limits, being correlated to one another by the action of the first means and being therefore electrically operative in order to generate an electric voltage.

According to a particular embodiment, the device forming the object of the invention is an alarm device able to indicate variations in the air pressure inside a rotating wheel, for instance in a motor vehicle, the first means being constituted by a pressure switch for measuring the air pressure, characterized in that the second means includes an electric battery, the electrodes and the electrolyte contained in a vessel being separated from each other when the measured air pressure lies within pre-established limits, the action of the moving element causing the electrolyte and the electrodes to come together in the vessel in an operating relation when the air pressure falls below pre-established values.

BRIEF DESCRIPTION OF THE DRAWING

The present invention will be better understood with reference to the attached drawings, given by way of example, in which.

The device described herebelow is an electric alarm device, suitable to indicate the variations of a physical quantity with respect to a standard safety value or with respect to any value not to be exceeded so as not to incur irregular working conditions of the plant or machine under control.

The device comprises first means sensitive to the value of the physical quantity being checked and second means, whose component parts come into contact with one another when the first means exert onto them a mechanical action; more precisely, the parts constituting the second means are separated from one another and are electrically inoperative in the condition corresponding to values of the physical quantity within pre-established limits, while they are forced into contact with one another when value of the measured physical quantity falls below the pre-established limits; in this latter condition the parts are moreover electrically operative and are able to generate an electric voltage.

In order to better illustrate the object of the invention, an embodiment of the device, for use in particular in indicating the irregular conditions of a physical quantity in a travelling vehicle, is described herebelow.

Among the various quantities which can be checked, the air pressure inside a rotating wheel (FIG. 1) is considered and the operation of the device is observed when the pressure decreases to a level below which the travelling of the vehicle is dangerous. Both the first means and the second means are applied to the wheel, and they are sensitive to the pressure of the air inflating the tire through a hollow tube which is in communication with the air valve 3 of the tire 1, to which it is connected with fitting means, not illustrated. It is understood that both the first means and the second means constitute the device of one wheel, and that analogous devices may be provided for the other wheels of the vehicle.

Figure 1:
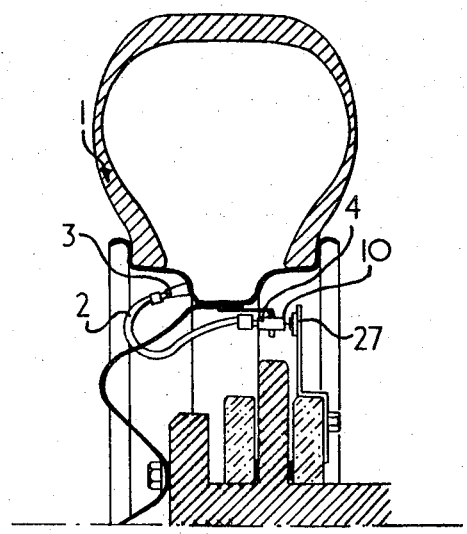
FIG. 1 represents the position of the alarm device on the wheel and the position of a receiving device, which is stationary with respect to the wheel.

The first means are constituted by a pressure switch 4 (FIG. 3) for measuring the air pressure, and by a moving element 5 (FIG. 3) which is displaceable under the action of a mechanical stress when the pressure drops below the minimum admissible level. Both the pressure switch and the moving element are of conventional type already known per se, and are not an object of the present invention. The constructional shape of the pressure switch and its application to the wheel are indicated in all the publications concerning gauges for measuring air pressure inside a tire; it need be said only that said pressure switch is screwed to the end of the tube 2 in communication with the air valve 3 (FIG. 1).

Figure 3:
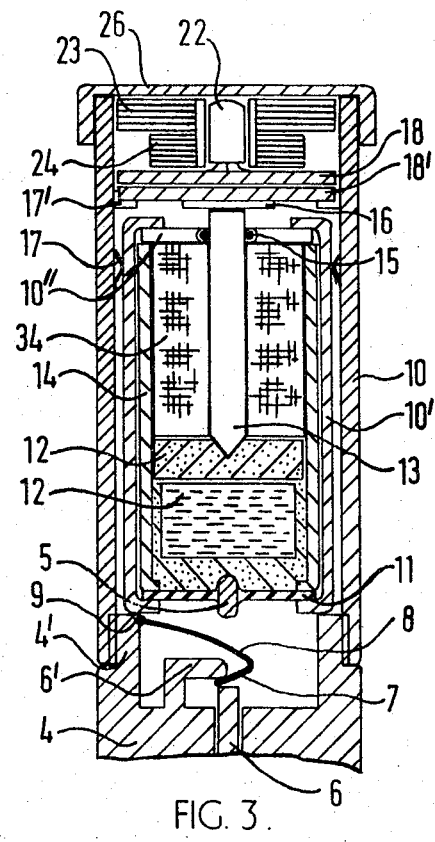
FIG. 3 represents a cross section of the alarm device.

The body of the pressure switch (FIG. 3) carries a slidable piston 6 and a locking element 6', whose upper part is so bent as to be able to retain, by means of the slidable piston 6, the end 7 of an elastic strip 8, fixed in turn at its other end 9 to the wall 4' of the body of the pressure switch. The slidable piston 6 is represented in FIG. 3 in the position corresponding to nornal air pressure values, while in the condition corresponding to values of air pressure below the allowable limit, the piston will take different positions to permit the detachment of the end 7 of the elastic strip, which will therefore be able to transform its elastic energy into kinetic energy and be displaced from the position of equilibrium shown in FIG. 3.

It is understood, even if this is not illustrated, that the pressure switch, besides measuring the air pressure, is constructed in such a way as to cause the movement of piston 6 only for values of air pressure below the pre-established ones, and not for variations of the air pressure within the pre-established limits; for this reason it is calibrated before its application. For instance, if it is established that for a motor vehicle the value of the inflation pressure is 1.5 atm, the pressure switch is so calibrated that the slidable piston will be moved only for pressure values below 1.2 atm. Thus, the allowable pre-established limit is 1.2 atm. For a truck, if it is for instance established that the inflation pressure has a value of 8 atm, the pressure switch is so calibrated that the actuation of the slidable piston takes place only for values of the air pressure below 6.5 atm; thus the allowable pre-established limit is 6.5 atm.

Still with respect to the pressure switch, it can be noted that its walls 4' are externally threaded to permit the screwing onto it of a hollow housing 10. The housing contains a hollow cylinder 10', made of zinc, and limited at its bottom by a membrane 11, of rubber or of an equivalent elastomeric material, which is made fast to the cylinder as it will be explained later. The central portion of the membrane contains the moving element 5, which is made of a hard material, as for instance steel, and which will be subjected to the mechanical action of the end 7 of the elastic strip, when this is released in consequence of the lowering of the slidable piston.

Having described the first, pressure sensing means, description will now be had of the second, power supply means, which includes voltage supply similar to that of a battery. However, in this case the parts constituting, in particular, the electrodes and the electrolyte, are separated from each other and are held in an electrically inoperative condition when the air pressure measured by the first means is within pre-established limits. When the measured air pressure falls below the pre-established limits, the electrolyte is brought into contact with the electrodes in order to begin generating a supply of voltage to power the alarm system.

As it can be seen in FIG. 3, this feature is made possible by a device in which the electrolyte is contained in a vessel 12, whose walls completely separate the electrolyte liquid from a copper electrode 13 and a zinc electrode 14, inside the hollow cylinder 10'. The zinc electrode 14 is arranged inside the hollow cylinder 10' and the lower edges of the latter end of the electrode 14 are folded in such a way as to retain the rubber membrane 11.

The vessel is so constructed that communication can be established between the electrolyte and the electrodes when the condition corresponding to unacceptable variations of the air pressure occurs; for instance, vessel 12 can be constituted by a glass ampoule and/or by a material which can be torn, as for instance plastic material. As can be understood, as soon as the slidable piston 6 moves downward in the figure) away from its equilibrium position, the elastic strip 8 is released to thereby force the moving element 5, and thus the rubber membrane 11, upward, causing the rupture of the glass ampoule 12, and allowing the electrolyte to flow into the surrounding space between electrodes 13, 14. Obviously, moving element 5 could be omitted, since the displacement upward of the rubber membrane, with the aid of the copper electrode, pointed at its lower end, would be adequate to cause the rupture of the vessel 12.

The glass ampoule is surrounded by a spongy material 12' which acts as an anti-shock means to prevent an accidental rupture of the ampoule, and also facilitates the flow of the electrolyte in the surrounding space, in particular towards the electrodes.

As noted, the electrodes in this embodiment are constituted by copper and zinc; more precisely, the first electrode 13 is copper wire having a diameter of a few millimeters, and the second electrode 14 is constituted by a zinc sleeve situated concentrically to the first electrode and separated therefrom by the presence of an absorbing material, for instance blotting paper, which is intended to be completely impregnated by the electrolyte flowing out of the ruptured glass ampoule.

The electrolyte cannot escape from the hollow sleeve 10', made of zinc, due to the presence of a disc 10' of insulating material enclosed between the upper edges of the electrode 14 and the hollow cylinder 10'. An O-ring 15, or an equivalent sealing gasket, is provided on the disc 10'' around the central electrode 13 at the outlet of the latter from the disc 10'' (FIG. 3).

The terminals of the two electrodes are constituted by a circular plate 16, in contact with the copper electrode, and by two metallic zones 17, of reduced extension, on the housing 10, in order to connect the zinc electrode, and therefore the hollow sleeve 10', made of zinc, to the metallic surface of the housing 10. Between the circular plate 16 and any point of the metallic surface of the housing there is consequently an electric voltage, produced ultimately by the variation of the measured air pressure below the pre-established limit.

Having described the first and second means of the device, and the conditions for generating the electric supply voltage, an example of an alarm system which can be used with this device will now be described.

To this end, the base plate 18 on which an electric circuit 19 is mounted is inserted in the upper part of the housing 10; the lead lines 20 and 21 of the circuit (FIG. 2) are directly connected to the circular plate 16 and to a point of the metallic surface of the housing 10. The circular plate 16 consists of a copper sheet formed on a base 18', located below the base 18, of the type normally used in printed circuits; the base 18' can be etched by known techniques to leave copper layers only at the central and lateral portions of the lower surface, the lateral portions being folded at 17' to contact housing 10. The copper portions 17' in contact with the housing 10 represent the polarity of the zinc electrode and the copper circular plate 16 represents the polarity of the copper electrode.

Figure 2:
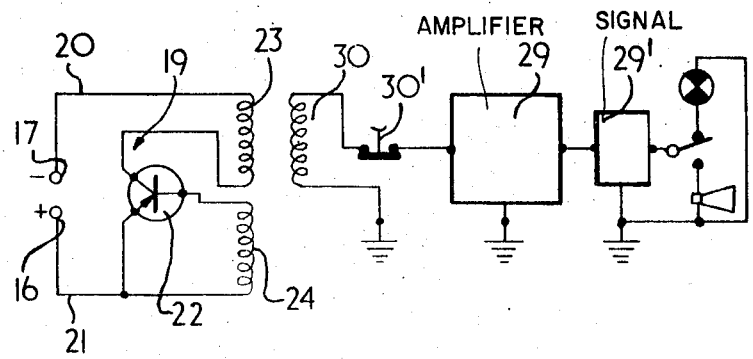
FIG. 2 represents the electric circuit of the alarm device.

The electric circuit 19 is a known oscillating type circuit, and comprises a transistor 22, with a common emitter connection and two coils 23 and 24 (FIGS. 2-3).

By observing the position of the components on the base 18 (FIG. 3), it can be noted that the coils 23 and 24 are situated one above the other, that the transistor is positioned inside the central cavity created by the windings of the two coils, and that its terminals on the base 18 serve for the connections with the coils; the connections of the emitter of the transistor and of the free ends of the two coils with the two electrodes are made by wires passing from the base 18 to the base 18' (FIGS. 2 and 3).

To enclose the electric circuit 19, a lid 26 of plastic material is forced about and on the housing 10; the lid does double duty by keeping the circuit block in a stationary position and providing a hermetic seal. Otherwise, the electric circuit can be embedded in a resin.

In this respect, it is to be pointed out that the power supply means are independent of the components of the electric circuit 19 and of the bases 18 and 18'. This allows the housing 10 and the bases 18 and 18' with their electric components to be retained and reused, it being necessary only to replace the hollow sleeve 10' and its contents.

Having described the portions of the device mounted on the wheel, description will now be had of the parts which are stationary with respect to said wheel, and more precisely of those parts which are intended to receive the electric signal transmitted by the rotating wheel when the air pressure drops below an acceptable minimum level and to produce a visual or audible indication of such a situation.

To this end, a coil 30 (FIG. 2) is situated on a support 27 (FIG. 1) which is stationary with respect to the wheel, and is arranged in proximity to the latter. This coil 30, in turn, can be connected in series with a pushbutton 30', and is then connected to an instrument 29 (FIG. 2).

Figure 4:
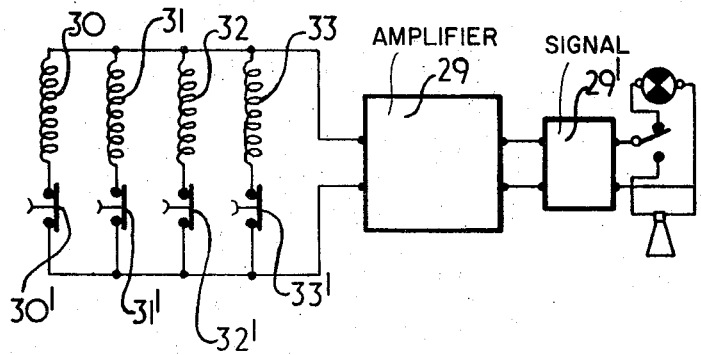
FIG. 4 represents a diagram of the connections to the alarm device.

FIG. 4 represents a circuit which, in the case of four wheels, permits easily locating the wheel in which the pressure variation has taken place, without having to directly check the pressure of each single wheel with a pressure switch. This circuit includes four coils 30, 31, 32, 33 and four pushbuttons 30', 31', 32' and 33', one end of each pushbutton being connected with one end of each coil. The other free ends of each pushbutton are connected to one another and to one terminal of the electric instrument 29, while the free ends of each coil are connected to one another and to the other terminal of the instrument 29.

The instrument 29 comprises various amplification stages, and is able to detect the oscillations generated in the electric circuit mounted on the wheel or wheels, and to indicate—as explained below—in which wheel the air pressure is lacking, warning the driver by means of a visible or audible signal issued by the device 29', which comprises a lamp or a loudspeaker.

When the air pressure in all the wheels is within the pre-established limits, the device mounted on each wheel is in the condition shown in FIG. 3, namely the elastic strip 8 is connected at its end 7 between the slidable piston 6 and the locking element 6', the electrolyte is contained in the ampoule 12 and no electrolyte exists between the copper electrode 13 and the zinc electrode 14.

As soon as the air pressure in a wheel decreases below an allowable limit, the slidable piston 6 moves downward, and consequently the end 7 of the strip 8 is released from its locked position. Therefore the elastic strip transmits its elastic energy to the moving element 5; the latter, which was retained by the rubber membrane 11, moves from its preceding position to push the glass ampoule 12 against the point of electrode 13 and to break it. Under these conditions, the electrolyte flows in the surrounding space, in particular between the electrodes 13 and 14, where it remains due to the presence of the blotting paper. Only at this time does the battery constituted by the electrodes 13, 14 and by the electrolyte become electrically operative, and the voltage present at terminals 16 and 17 supplies power to the electric circuit and the transistor 22, whose oscillations are sensed by the instrument 29, which transmits a visible or audible warning signal to the driver.

In order to ascertain which is the wheel where air pressure is lacking, the pushbuttons in series with the stationary coils are pressed individually. By pressing the pushbutton in series with the stationary coil adjacent the wheel deficient in air pressure, the warning signal is interrupted; thus the defective wheel can be quickly located in order to restore the correct air pressure in that wheel.

Of course, there may be no necessity to locate the wheel lacking air pressure; in this case, the instrument 29 is connected to the coils 30, 31, 32, 33, without the provision of the pushbuttons, so that the system is more economical. After having stopped the vehicle, further to the location of the wheel lacking air pressure, the correct air pressure in the tire can be restored together with the normal operating condition of the alarm device.

As it can be seen from the above description, it is necessary for the main parts of the second supply means, namely the electrodes and the electrolyte, to be separated in order to supply operating voltage to the device only at the necessary time and for the period corresponding to the lack of air pressure in the wheel. After having restored the correct air pressure in the tire, the housing 10 is unscrewed from the pressure switch and the hollow sleeve 10' together with its content is removed; the elastic strip 8 is reloaded, a new hollow sleeve 10'—containing the same parts as the preceding one, but in which the electrolyte is separated from the electrodes—is inserted in the housing 10 and finally the housing 10 is screwed again on the pressure switch. With this operation, all the conditions of a reliable operation of the alarm device are again ensured.

A principal advantage of the present device is that the electric circuit 19, mounted on the wheel, is neither connected to nor comprises mechanical means, such as a switch, which, as a consequence of contact oxidization, could result in an improper operation of the alarm device.

It is understood that the details of construction of the device forming the object of the invention can, of course, be varied as necessary as the present invention includes in its scope any alternative embodiment deriving from the above indicated inventive concept.

What is claimed is:

1. Apparatus for monitoring a physical quantity in a pneumatic tire and for providing an indication of a variation in said physical quantity outside a preset acceptable limit, said apparatus comprising:
   a. a battery having two electrodes and an electrolyte contained in an outer casing, said electrolyte being contained in a sealed container within said outer casing;
   b. detector means for monitoring said physical quantity and detecting said variation outside said preset acceptable limit; and
   c. means coupled to said detector means to open said sealed casing when said variation is detected, thereby permitting contact between said electrolyte and said electrodes to generate a voltage output.

2. The apparatus according to claim 1, further comprising a pressure switch for monitoring the pressure in a pneumatic tire, said means permitting contact between said electrolyte and said electrodes to generate said voltage output when said pressure switch detects a pressure in said tire which is below said preset acceptable limit.

3. The apparatus according to claim 1, further comprising: a pressure switch for monitoring the pressure in a pneumatic tire; said supply means comprising a battery having two electrodes and an electrolyte, said electrolyte being maintained normally separated from said electrodes; and means to bring said electrolyte and said electrodes into contact when said pressure switch detects a pressure in said tire which is below said preset acceptable limit.

4. The apparatus according to claim 3, wherein said electrodes and electrolyte are housed in a casing, said electrolyte is contained in a sealed container within said casing and said casing contains an absorbant material located between said two electrodes and a cushioning material located substantially around said sealed container.

5. The apparatus according to claim 3, further comprising a housing containing said supply means, said pressure switch and said means to bring said electrolyte and said electrodes into contact, said housing being mounted for rotation with said tire.

6. The apparatus according to claim 5, further comprising a circuit including an oscillator and a coil coupled to the output of said oscillator for transmitting an electromagnetic signal corresponding to the output oscillations of said oscillator, the input of said oscillator being connected to the output of said battery without the interposition of switchable mechanical contacts.

7. The apparatus according to claim 6, further comprising a pickup coil mounted on a stationary support relative to said tire for receiving signals transmitted by the coil coupled to said oscillator; and means coupled to the output of said pickup coil for producing a warning signal when said variation from said preset acceptable limit is detected.

* * * * *